(12) United States Patent
Park

(10) Patent No.: US 6,659,695 B2
(45) Date of Patent: Dec. 9, 2003

(54) WOODWORKING DOWEL MASTER JIG

(76) Inventor: Joon Park, 1320 Virginia Ave., Glendale, CA (US) 91202

( * ) Notice: Subject to any disclaimer, the term of this patent is extended or adjusted under 35 U.S.C. 154(b) by 0 days.

(21) Appl. No.: 09/828,682

(22) Filed: Apr. 9, 2001

(65) Prior Publication Data

US 2001/0036389 A1 Nov. 1, 2001

Related U.S. Application Data

(60) Provisional application No. 60/201,363, filed on May 2, 2000.

(51) Int. Cl.[7] ............................................... B23B 49/00
(52) U.S. Cl. .................................... 408/103; 408/115 R
(58) Field of Search ........................... 408/72 B, 115 B, 408/115 R, 103, 108, 109, 104, 105

(56) References Cited

U.S. PATENT DOCUMENTS

| | | | | | |
|---|---|---|---|---|---|
| 2,470,038 A | * | 5/1949 | Long | ...................... | 408/115 R |
| 2,602,238 A | * | 7/1952 | Wellman | ................. | 408/115 R |
| 2,763,299 A | * | 9/1956 | Cerf, Jr. | .................. | 408/115 R |
| 3,049,031 A | * | 8/1962 | Carstens | ................. | 408/115 R |
| 3,062,076 A | * | 11/1962 | Craig | ........................ | 408/104 |
| 3,674,376 A | * | 7/1972 | Silken | ..................... | 408/115 R |
| 4,421,442 A | * | 12/1983 | Lindblad | ................ | 408/115 R |
| 4,594,032 A | * | 6/1986 | Warburg | ................ | 408/115 R |
| 5,407,307 A | * | 4/1995 | Park | ........................ | 408/115 R |
| 5,466,098 A | * | 11/1995 | Juang | ..................... | 408/115 R |
| 5,782,006 A | * | 7/1998 | Erway et al. | ........... | 408/115 R |

* cited by examiner

*Primary Examiner*—Daniel W. Howell
(74) *Attorney, Agent, or Firm*—Christie, Parker & Hale, LLP

(57) ABSTRACT

The woodworking doweling jig has first and second clamp members slidably mounted on guide rods. Drill guide holes are provided in the clamp members or in separately adjustable drill guide members. When the separate drill guide members are provided, they are slidably mounted on the guide rods to maintain alignment. Dowel guide slots are provided in an alignment member which may be part of the upper clamp member. The alignment member has dowel guide slots in it which are in alignment with the drill guide holes in the guide member(s). Adjustment can provide for dowel drilling the same distance from one workpiece surface for aligning the surface. The jig can also be used for mounting the end of one plank against the side of a second plank either at its end or away from the end.

12 Claims, 3 Drawing Sheets

WOODWORKING DOWEL MASTER JIG

CROSS-REFERENCE

This application relies upon provisional patent application, Ser. No. 60/201,363, filed on May 2, 2000, entitled "Dowel Master," for priority.

FIELD OF THE INVENTION

This invention relates to drilling guides and more particularly to doweling jigs that facilitate the generation of accurately drilled dowel receiving holes in wood workpieces which are to be joined in abutting edge-to-edge, edge-to-end and edge-to-inside of surface joinery operations.

BACKGROUND OF THE INVENTION

U.S. Pat. No. 2,602,238 to Wellman and the improved U.S. Pat. No. 5,782,006 to Erway, et al demonstrate centering jigs that are capable of moving two opposing clamp jaws simultaneously. The drill guide member is centrally located to drill through the center of the workpiece. These two jigs function satisfactorily if the two workpieces being joined are of exactly the same thickness. For edge-to-edge assembly sequences, any variations in thickness of the adjoining workpieces will cause a step at the joint which requires sanding to bring the joining pieces flush. Also, these centering jigs do not accommodate the edge-to-surface joint operation. Furthermore, the drill guide member provides several different bore sizes that limit the user to drill only one hole at a time.

The doweling jigs made by Dowel-it Co. allow the user to select drill bushings for the particular dowel operations, but the hole into which the bushing is screwed cannot be used for the drill guide because those holes are not standard sizes. Internally threaded bores which receive the interchangeable bushings are not usable as drilling guides.

In U.S. Pat. No. 5,407,307 to Park, the doweling jig facilitates the generation of accurately drilled, dowel receiving holes in workpieces which are to be joined in abutting, edge-to-edge, or edge-to-surface joints. Since this doweling jig has drill guide bushings that are permanently located in the clamping assemblies, it has limited hole size capability. Moreover, securing the clamping assemblies for the edge-to-surface operation is not user-friendly because of the lack of holding means during use.

There is need for a doweling jig which permits drilling dowel holes which are positioned so that, when two pieces of wood are edge-joined, one surface is even to reduce sanding.

There is also need for a doweling jig which can clamp two pieces of wood together so that the companion dowel holes are drilled at the same time.

There is also need for a doweling jig which is capable of application in different ways, such as selectively drilling companion dowel holes the same distance from the surface on two different boards to be edge-glued or centering them in those boards. It is desirable for the doweling jig to be sufficiently versatile to also permit the drilling of dowel holes in an edge-to-end holes in one board and companion side surface holes at the end of or intermediate the ends of another board. Thus, there is need for a versatile doweling jig.

SUMMARY OF THE INVENTION

In order to aid in the understanding of this invention, it can be stated in essentially summary form that it is directed to a woodworking doweling jig. The doweling jig includes two clamp members for clamping together two planks. The guide rods permit sliding clamping motion between the two clamp members. At least one drill guide, and preferably two, are mounted between the clamp members. The drill guides have dowel drill holes therein which are aligned in the direction of the guide rods. The dowel drill holes preferably have interchangeable bushings. An alignment member is mounted either separately or integrally with the top clamp member. The alignment member has guide slots therein in alignment with the drill guide holes for assuring the alignment of edge-mounted dowel holes with surface-drilled dowel holes.

It is a purpose and advantage of this invention to provide a doweling jig that provides accurate drilling guides for the drilling of dowel-receiving holes for (1) edge-to-edge, (2) edge-to-end of surface, and (3) edge-to-inside of surface operations in one tool.

It is another purpose and advantage of this invention to provide a doweling jig that is easy to use, requires minimal or no set-up, is quick in application, yields accurately placed drill guide center locations for all three major doweling operations, and yields flush workpiece surfaces after the final doweling and assembly sequences are completed.

It is another purpose and advantage of this invention to provide a doweling jig which has self-centering and flush surface joint capabilities in one tool.

It is another purpose and advantage of this invention to provide a doweling jig that allows the user to select the distance from the center of the hole to the surface of the workpiece.

It is another purpose and advantage of this invention to provide a doweling jig that can clamp two workpieces for drilling during one clamping operation for edge-to-edge operations.

It is another purpose and advantage of this invention to provide a doweling jig that has a separable alignment block for edge-to-surface operations.

It is another purpose and advantage of this invention to provide a doweling jig that provides two functions for bored holes to accommodate interchangeable bushings. The drill guide bore is configured not only to be used for a drilling guide but also to be able to carry interchangeable bushings to achieve any reduced size drilling.

It is another purpose and advantage of this invention to provide a doweling jig which also has V-grooves on the clamping surfaces to drill holes axially in the center of round workpieces.

DESCRIPTION OF THE PREFERRED EMBODIMENTS

Figure 1:
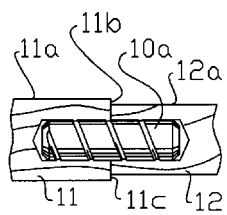
FIG. 1 is a sectional view of two workpieces, one thinner than the other, in an edge-to-edge joint with a dowel that is located by a self-centering drilling operation.

Referring to FIG. 1, a typical edge-to-edge joint of workpieces 10 and 11 is created by self-centering dowel jigs with a dowel 10a. Any thickness variation in workpiece 11 and 12 will yield steps 11b and 11c that will result in surface steps between surfaces 11a and 12a. These joints will require sanding top surface 11a to bring flush to the other top surface 12a.

Figure 2:
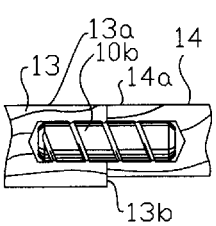
FIG. 2 is a sectional view of two workpieces in an edge-to-edge joint with a dowel that is located by a one-surface reference drilling operation.

FIG. 2 is an improved edge-to-edge joint created by reference drilling/doweling. The distance between the center of dowel 10b and the top surfaces 13a and 14a of workpieces 13 and 14, respectively, is equal, leaving step 13b on the far side from the top reference surface 13a. This preferred referenced joining would not require any sanding.

Figure 3:
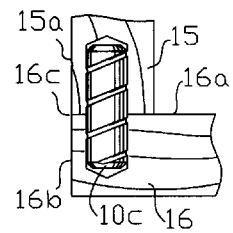
FIG. 3 is a sectional view of two workpieces doweled together on an edge-to-end of surface joint.
Figure 4:
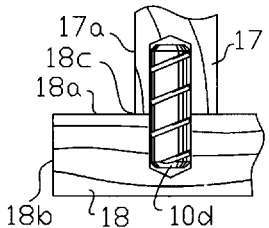
FIG. 4 is a sectional view of two workpieces doweled together on an edge-to-inside of surface joint.

FIG. 3 is an edge-to-end of surface joint and FIG. 4 is an edge-to-inside of surface joint. The upright workpieces 15 and 17 are prepared by reference drilling and doweling. The definition of an edge-to-end of surface joint is that the face surface 15a and the end or edge surface 16b of workpieces 15 and 16, respectively, are flush. The definition of an edge-to-inside of surface joint is that the reference surface 17a and edge surface 18b of workpieces 17 and 18, respectively, are not flush. A marking line 18c is usually needed to locate this edge-to-inside of surface joint.

Figure 5:
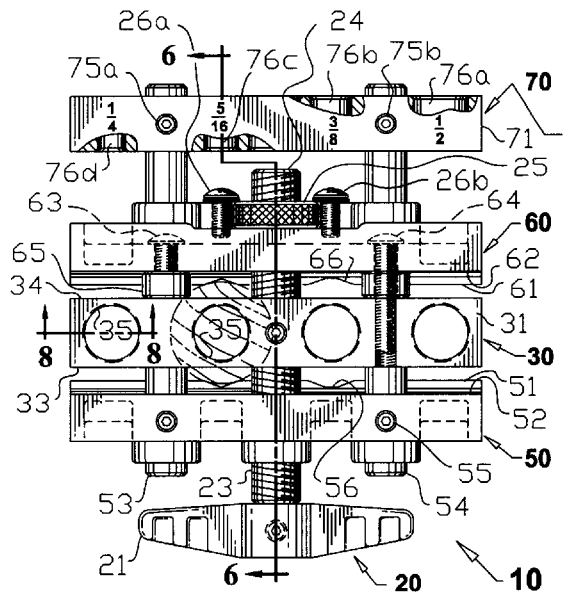
FIG. 5 is a plan view of the first preferred embodiment of the woodworking dowel master jig with a drill guide and clamp being utilized to drill a dowel receiving hole axially on the center of one end of a round stock, and with a separable alignment member. Structure for conversion from self-centering to reference surface operation is shown.
Figure 6:
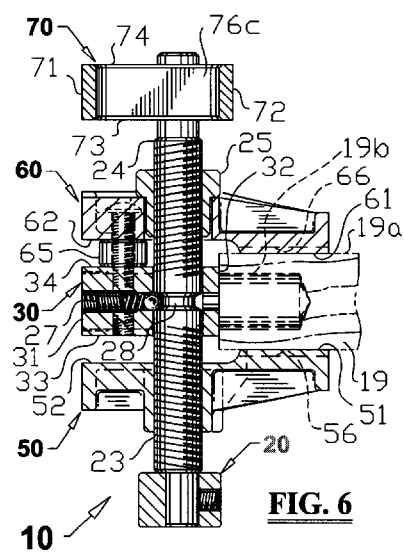
FIG. 6 is a sectional view taken generally along line 6—6 of FIG. 5.

Referring to FIGS. 5 and 6, the first embodiment 10 of the woodworking dowel master jig is comprised of a first clamp member 50, a second clamp member 60, and a drill guide member 30, all of which are slidably mounted on guide rods 53 and 54. Turning handle 21 causes the rotation of the screw assembly 20 which has a left hand thread 23 and a right hand thread 24. Rotation of the screw assembly moves the two clamp members 50 and 60 which have threads engaging the threaded rod sections. The two clamp members 50 and 60 slide freely on the guide rods 53 and 54.

The drill guide member 30 has parallel top and bottom surfaces 31 and 32 and parallel surfaces 33 and 34. The guide 30 has a plurality of longitudinally spaced vertical guide bores 35 of different or the same diameter, and of equal or unequal spacing.

The screw assembly 20 has an annular groove 28, between threads 23 and 24, that seats ball/spring/set screw detent 27 on the middle of guide 30. This structure permits free rotation of the screw assembly 20 while the clamp members 50 and 60 simultaneously move with rotation of the screw. The second clamp member 60 provides a seat for the nut 25 which is secured by screws 26a and 26b. The rotational adjustment of nut 25 adjusts the distance between clamping surface 61 and the center of bores 35. The recessed surfaces 52 and 62 of clamp members 50 and 60 allows clamping a thinner workpiece than the width of guide 30.

The clamping surfaces 51 and 61 have at least one pair of vertical V-grooves 56 and 66, respectively, aligned with one of the bores 35. Therefore, the drilling on the center of the end of a round stock as shown in FIG. 5 can be achieved.

Figure 7:
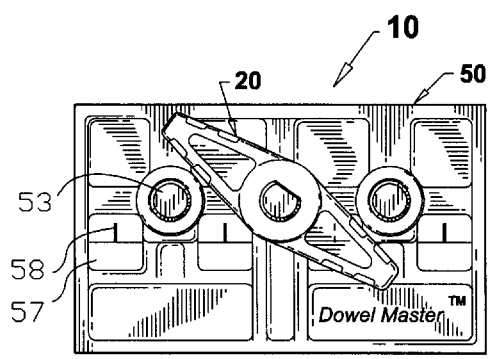
FIG. 7 is a front view of the first preferred embodiment.

To facilitate the positioning of the jig on a workpiece, the drill guide member 30 is provided with indicia 58 indicating the center of bore 35. At least one of the clamp members 50 and 60 is provided with opening 57 through which the indicia 58 may be viewed as shown in FIG. 7.

Self-centering drilling of the workpieces achieved by the doweling jig 10 by placing workpiece between the first and second clamp members 50 and 60 and, thereupon, tightening the clamp members against the workpiece by rotating the screw assembly 20. A workpiece 19 is illustrated in FIG. 6. As the screw is rotated, its oppositely threaded sections bring the clamp members together so that the workpiece 19 is clamped between the clamp surfaces 51 and 61. The drill guide member 30 is retained exactly halfway between the clamp members by the detent 27 engaging in the groove 28 in the middle of the screw. The drill guide member moves freely on the guide rods 53 and 54 so that it can maintain its exactly centered position. If the workpiece is the end of a piece of round stock, it can be clamped in the V-grooves 56 and 66 so that it is maintained exactly in alignment with one of the drill guide bores 35.

To achieve a drilling/doweling operation that achieves the flush surface result shown in FIG. 2, the distance between second clamp member 60 and the guide member 30 is fixed. The structure in FIGS. 5 and 6 is one of the clamping systems. The ball/spring/set screw detent 27 is released. The screws 63 and 64 extend down through holes in second clamp 60 and through predetermined spacers 65 to engage in threaded holes in drill guide 30. When the screw assembly 20 is rotated the drill guide member 30 follows the second clamp member 60 and the clamping surface 51 of first clamp member 50 grasps the workpiece 19. Then the distance between clamping surface 61 and bores 35 is fixed. Thus, regardless of thickness variations on the workpiece 19, the distance between dowel receiving holes 19b and reference surface 19a is constant.

Figure 8:
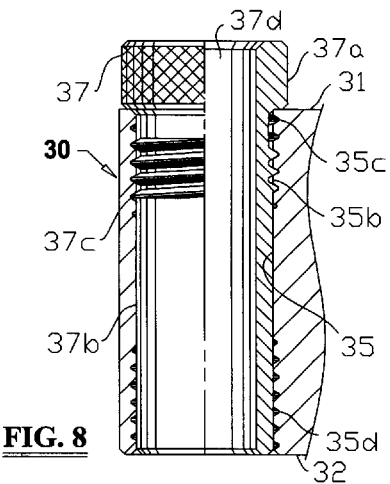
FIG. 8 is an enlarged sectional view as seen generally along line 8—8 of FIG. 5 with an interchangeable bushing that is fastened into the bore of the drill guide member.

Conventional threads do not permit a threaded hole to be used as a drill guide bore. However, specially designed threads permit the partially threaded length of the guide hole 35 to also serve as a drill guide. As shown in FIG. 8, the drill guide bore 35 is comprised of a straight bore portion in the middle and partial internal threads 35c and 35d adjacent the top and bottom surfaces 31 and 32. The partial internal thread 35c leaves an extended annular flat bore 35b from the top and bottom surfaces 31 and 32. As an example, bore 35 is a 0.501 inch through hole. The threads are generated by a tap with a major diameter of 0.541 inch and a pitch diameter of 0.501 inch with threads of 16 pitch per inch. This generates internal thread portions 35c and 35d, and extended flat bore portion 35b as substantially equal distances. Therefore, this hole can be used for ½ inch drilling guide. The interchangeable bushing 37 has a head 37a with reduced diameter interior smooth portion 37b which may be 0.376, 0.314, or 0.251 inch in diameter. The bushing 37 has 0.541 OD external thread 37c under the head 37a and the smooth portion 37b has 0.500 inch outside diameter. It is preferred to have the internal thread 35d also from bottom surface 32 for edge-to-surface drilling/doweling operations. Therefore the guide member 30 can be used as a hole such as 0.500 without the bushing and 0.375, 0.313, 0.250 with the bushing 37.

Figure 9:
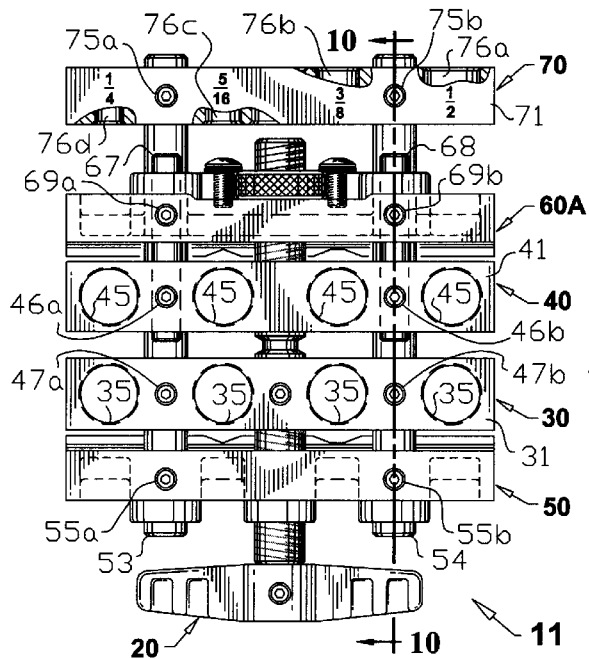
FIG. 9 is a plan view of the second preferred embodiment of this invention with two drill guide members placed between the first and second clamp members and with an alignment member attached on guide rods.
Figure 10:
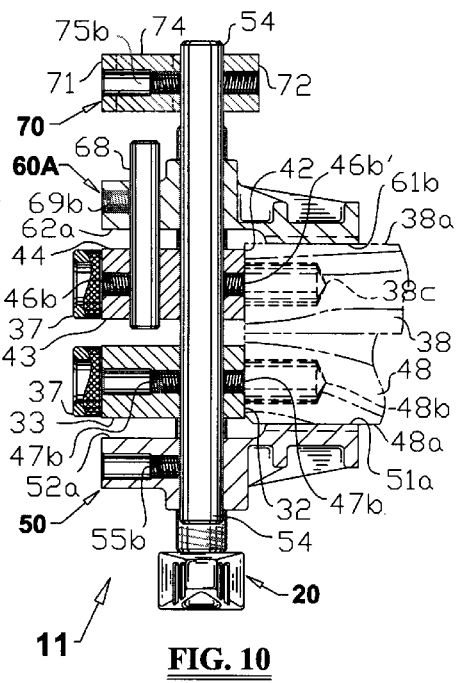
FIG. 10 is a sectional view taken along line 10—10 of FIG. 9 with two workpieces placed between clamp members with the jig set to achieve the configuration as shown in FIG. 2.

Drilling of positioned dowel holes can be achieved by placing two drill guide members 30 and 40 between clamp members 50 and 60A as shown in FIGS. 9 and 10. This structure does not use the ball/spring/set screw detent 27 of FIG. 6. This second embodiment 11 utilizes all members from the first embodiment 10, with additional second drill guide member 40 and a different structure for positioning the drill guide members as compared to FIGS. 5 and 6. The distance between the center of bores 35 and clamping surface 51a and the center of bores 45 and the secondary clamping surface 61b can be set by fastening set screws 47a, 47b, 55a, and 55b on to the main guide rods 53 and 54, and set screws 46a, 46b, 69a, and 69b on to the secondary rods 67 and 69. Therefore the two clamp members 40 and 60A, and guide members 30 and 50 slide simultaneously by turning screw assembly 20. The workpieces 38 and 48 can be clamped as shown to permit subsequent drilling.

The distance between the center of hole 38c and reference surface 38a of workpiece 38 is the same as the center of hole 48b and reference surface 48a; thus the edge-to-edge dowel joining can be achieved effectively, as shown in FIG. 2. To generate any step between referenced surface 13a and 14a, a different distance between the drill guides 30 and 40 and clamp members 50 and 60A can be adjusted and set.

Figure 11:
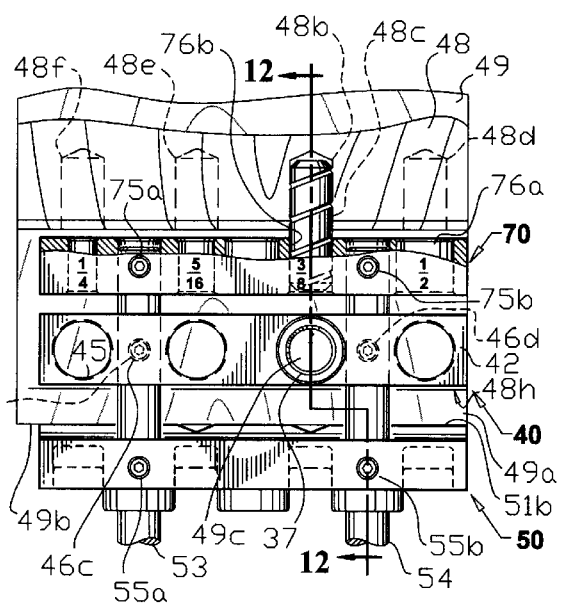
FIG. 11 is a plan view of another setup of the jig of FIG. 9 which demonstrates the edge-to-surface drilling operation being used to drill dowel receiving holes in a second workpiece.
Figure 12:
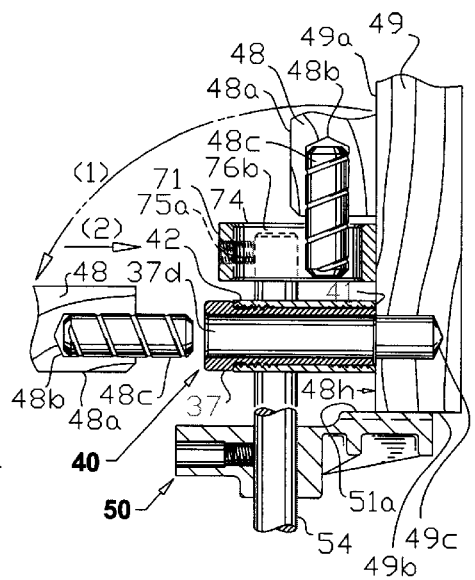
FIG. 12 is a sectional view taken along line 12—12 of FIG. 11.

As shown in FIGS. 11 and 12, one of the doweled workpieces 48 is placed in edge alignment on the third workpiece 49. The alignment member 70, drill guide member 40, and clamp member 50 are held by fastening set screws 55a, 55b, 46c, 46d, 75a, and 75b on to the guide rods 53 and 54. The clamping surface 51a is placed to butt on the edge 49b of the third workpiece 49 and the guide 40 is placed referenced to marking 48h where the referenced surface 48a will be joined by the dowel 48c. The dowel 48c is partially extended out to engage into the equivalent slot 76b, then the dowel-receiving hole 49c is drilled on to the third workpiece 49 through an interchangeable bushing 37. The alignment member 70 has plural slots 76a, 76b, 76c, 76d for the selection of different dowel holes to be drilled and used.

The slots 76 in the alignment member 70 are in vertical alignment with the center lines of drill bushings 37. This permits the reference dowel to be placed in the appropriate slot 76 and the corresponding sized drill bushing placed in the bushing hole 35 directly below it. This creates alignment between the existing dowel position and the dowel hole 49c. The sequence of the placement of the first workpiece 48 to the third workpiece 49 is illustrated by arrows (1) and (2) in FIG. 12.

Figure 13:
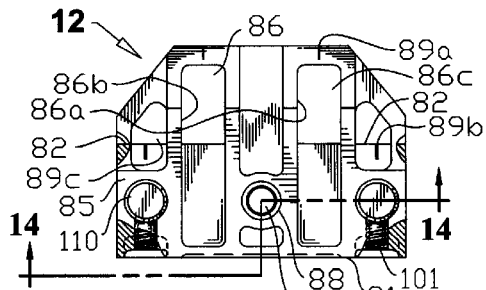
FIG. 13 is a plan view of the third preferred embodiment of the woodworking doweling jig of this invention.
Figure 14:
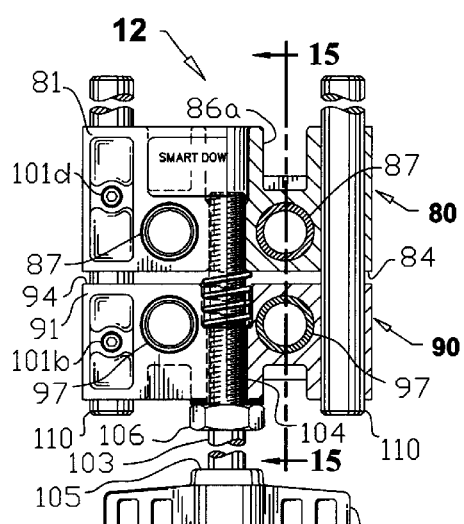
FIG. 14 is a partial sectional view taken along line 14—14 of FIG. 13.
Figure 15:
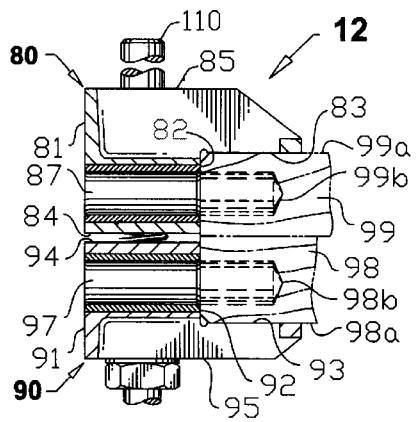
FIG. 15 is a sectional view taken along line 15—15 of FIG. 14.

The most simple yet versatile third embodiment 12 of the woodworking dowel jig of this invention is shown in FIGS. 13, 14, and 15. It is comprised of an upper and lower clamping assemblies 80 and 90. The two clamping assemblies are slidably mounted in guide rods 110 and are movable to achieve clamping of workpieces 98 and 99 therebetween. Screw assembly 102 engages a threaded hole in upper member 80 and passes through a clearance hole in lower member 90. A spring separates the clamping assemblies 80 and 90 when unclamped.

The guide rods 110 are positioned halfway between the front surface 81 and abutting surface 82. First, the plank 98 has its dowel hole 98b drilled by inserting the drill through bushing 97 when the plank 98 is clamped, as shown in FIG. 13. After the drilling of that dowel hole, the dowel 98b is installed, as seen in FIG. 17. Furthermore, the upper clamp member 80 is turned around on the guide rods, as shown in FIG. 17. The surface 81 on what was formerly the front of the upper clamp member 80 is now in alignment with abutting surface 92 of the lower clamp member 90. The blank 100 is put in place against the jaw surface 93 and against the abutting surface 81. Lateral positioning alignment is achieved by positioning the dowel 98b into alignment slot 86b, see FIGS. 16 and 17. The alignment slot 86b is in vertical alignment with both the dowel bushing holes 87c and 97c. Therefore, with the planks 98 and 100 aligned with each other, the drill bushing hole 86c is aligned with the dowel 98b. The mating dowel hole 87c can be drilled if it is desired that the plank 98 be away from the end 100b. On the other hand, if the planks are to be in corner-alignment, the dowel hole 97c is drilled. This operation is demonstrated by arrows (1), (2), and (3) in FIG. 17. The upper clamp member 80 has alignment slots 86a and 86b that are aligned to the drill guide 87a and 87b by the centerlines and are subsequently coaxial. There are other openings 89c, 89a and 89b to determine the location of drilling positions for especially narrow workpieces. These slots gauge from one end of the workpiece to the desired drill hole location.

As shown in FIG. 14, the screw assembly 102 has a non-threaded portion 103 between external thread 104 and head seat 105. The removal of this nut 106 causes the distance between clamping surfaces 83 and 93 to be wider. Therefore it is capable of handling thicker workpieces.

The distances between the center of bushing 87 to the clamping surface 83 and to the end surface 84 are equal. It is the same for the lower clamp member 90, therefore the workpieces 98 and 99 can achieve the reference joining as shown in FIG. 2.

Figure 16:
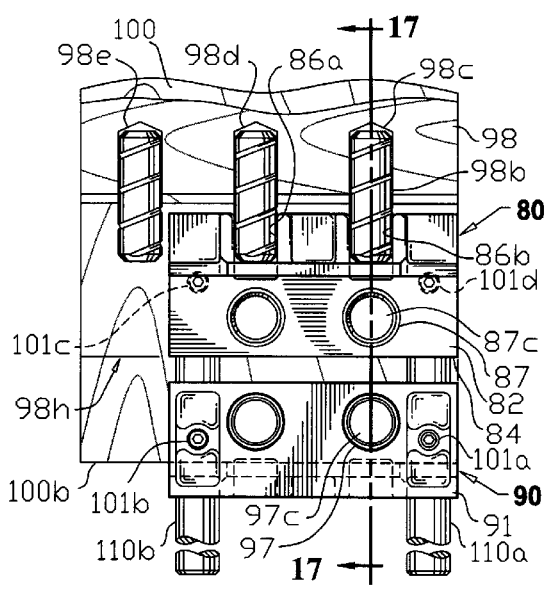
FIG. 16 is a plan view that demonstrates the edge-to-surface drilling operation sequence with the third preferred embodiment of the doweling jig. The jig and one of the workpieces prepared from on the jig of FIG. 5 are placed and aligned on another workpiece.
Figure 17:
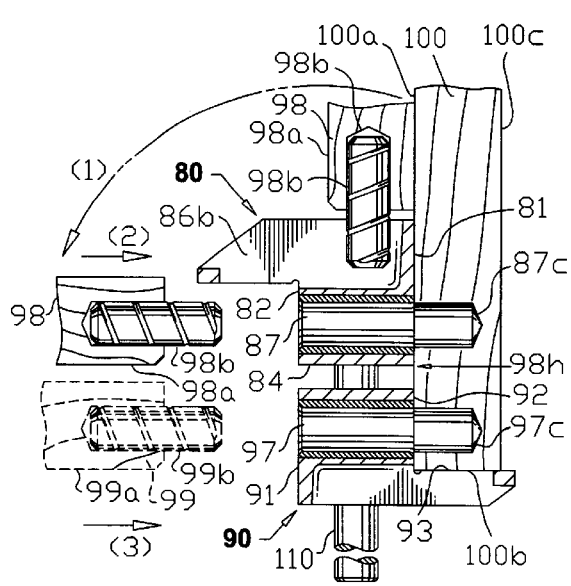
FIG. 17 is a sectional view taken along line 17—17 of FIG. 16.

FIGS. 16 and 17 demonstrate the edge-to-end of surface operation by lower clamp assembly 90 and the edge-to-inside of surface operation by upper clamp assembly 80 by placing the two clamp assemblies in opposite directions but held on guide rods 110 by set screws 101a, 101b, 101c, and 101d. As mentioned above, the front surface 81 and the abutting surface 92 are in plane because the guide rods 110 are placed in central positions between surface 91 and 92, and 81 and 82. Because the surfaces 81 and 92 are in plane, in FIG. 17, the clamp members 80 and 90 can be secured by placing a clamp between front surface 91 and bottom of third workpiece 100c. The distance between the reference surface 99a and the center of dowel 99b is equal to that of clamping surface 93 and the center of the drilled hole 97c that is being generated by drill guide 97, which yields the edge-to-end of surface operation as shown by arrows (1) and (3).

The other workpiece 98 has been pre-doweled in the manner shown in FIG. 15 and placed above workpiece 100 on which a marking line 98*h* has been drawn to match to the end surface 84. Drilling through drill guide 87 generates the distance between the center of the dowel receiving hole 87*c* and end surface 84, which is equal to the distance between reference surface 98*a* and the center of dowel 98*b*; therefore the reference surface 98*a* will be positioned with the marking line 98*h*. This sequence is illustrated by arrows (1) and (2).

The functionality of the alignment slot 86 of upper clamp member 80 is almost identical to that of the alignment member 70 in previous figures. Therefore the alignment function can be separated from the upper clamp member 80 and can be slidably mounted on the guide rods 110, as an alignment member as shown in FIGS. 5, 6, 9–12.

This invention has been described in its presently preferred best modes and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A jig comprising:
   a first member, said first member being configured to lie against a workpiece;
   a drill guide bore through said first member, said drill guide bore having a cylindrical interior surface, said drill guide bore having truncated threads extending radially inward from said cylindrical surface of said drill guide bore so that a drill can be guided through the drill guide bore and against said truncated threads to guide the drill to drill into a workpiece lying against said first member; and
   a drill guide bushing, said drill guide bushing having an exterior surface sized to fit within said drill guide bore and having external threads sized to fit said truncated threads, said drill guide bushing having an interior drill guide hole therethrough so that said bushing can be inserted into a drill guide bore for guiding a drill of smaller size than said drill guide bore.

2. A doweling jig comprising:
   first and second clamp members, each of said first and second clamp members having a clamping face;
   at least one guide rod, at least one of said clamp members being movably mounted on said guide rod so that said first and second clamp members can be moved toward and away from each other, said clamping faces facing each other and being substantially perpendicular to said guide rod;
   clamping structure engaging both said first and second clamp members to move said first and second clamp members toward each other to clamp a workpiece to be drilled for doweling between said clamping faces;
   a drill guide, said drill guide having at least one drill guide hole therein for the guidance of a drill to drill a dowel hole in the workpiece clamped between said first and second clamping faces, said drill guide hole being perpendicular to said guide rod; and
   an alignment member, said alignment member being separate from said clamps and said alignment member being mounted on said guide rod, said alignment member having at least one alignment dowel slot therein, said dowel alignment slot being in alignment with said drill guide hole so that a workpiece having a dowel extending therefrom can be positioned with its dowel in said dowel alignment slot so that it is in alignment with said drill guide hole for later mating of the dowel into the hole being drilled through said drill guide hole.

3. A doweling jig comprising:
   first and second clamp members, said first clamp member having a first clamping face, said second clamp member having a second clamping face, said first and second clamping faces facing each other;
   at least one guide rod, said clamp members being slidably mounted on said at least one guide rod;
   clamping structure engaging on both of said clamp members, said clamping structure comprising:
      a rotatable screw comprising:
         oppositely pitched first and second threads; and
         a groove between said first and second threads;
      a first nut engaged on said first thread and on said first clamp member and a second nut engaged on said second thread and on said second clamp member; and
   a drill guide member being mounted on said at least one guide rod between said clamp members, said drill guide member comprising a releasable locking structure, wherein said drill guide member can be locked to said groove of the rotatable screw using the releasable locking structure,
   means for fixing the drill guide member at a desired location on at least one guide rod, and means for fixing the first clamp member at a desired location on the same at least one guide rod that the drill guide member was fixed to, wherein when said first clamp member and said drill guide member are fixed to said at least one guide rod and said releasable locking structure is released, said drill guide member can move with said first clamp member, and
   wherein said clamp members move toward or away from each other depending on a direction of rotation of said rotatable screw when said releasable locking structure is engaged on said groove.

4. The doweling jig of claim 3 wherein said drill guide member has at least one drill guide bore formed therein, said at least one drill guide bore having a cylindrical interior surface and truncated threads extending radially inward from said cylindrical surface.

5. The doweling jig of claim 4, further comprising a drill guide bushing having an exterior surface sized to fit within said at least one drill guide bore and having external threads sized to fit said truncated threads, said drill guide bushing having an interior drill guide hole therethrough so that said bushing can be inserted into said at least one drill guide bore for guiding a drill of smaller size than said at least one drill guide bore.

6. The doweling jig of claim 3 wherein said drill guide member has at least two drill guide bores formed therein, each clamping face has at least two notches formed thereon, said notches being parallel to said drill guide bores, and each notch being in alignment with a corresponding one of said drill guide bores.

7. A doweling jig comprising:
   first and second clamp members, said first clamp member having a first clamping face, said second clamp member having a second clamping face, said first and second clamping faces facing each other;
   first and second guide rods, said clamp members being slidably mounted on said guide rods;
   clamping structure engaging on both of said clamp members, said clamping structure comprising:
      a rotatable screw comprising oppositely pitched first and second threads; and a first nut engaged on said first thread and on said first clamp and a second nut engaged on said second thread and on said second clamp number; and first and second drill guide members slidably mounted on said first and second guide rods, each drill guide member having at least one drill guide bore therein means for fixing the first drill guide member to the first guide rod at a desired location, and means for fixing the second drill guide member to the second guide rod at a desired location, means for fixing the first clamp means at a desired location on the first guide rod, and means for fixing the second clamp means at a desired location on the second guide rod, wherein the first clamp member and the first drill guide member can be fixed on the first guide rod, and the second clamp member and the second drill guide member can be fixed on the second guide rod, and wherein said first clamp member and the first drill guide member fixed on the first guide rod and the second clamp member and the second drill guide member fixed on the second guide rod move toward or away from each other depending on a direction of rotation of said rotatable screw.

8. The doweling jig of claim 7, further comprising at least one secondary guide rod disposed through the second clamp member and the second drill guide member, the second clamp member and the second drill guide member each having at least one screw for fixing to said at least one secondary guide rod at a desired location, wherein the first clamp member and the first drill guide member can be fixed on the first and second guide rods, and the second clamp member and the second drill guide member can be fixed on said at least one secondary guide rod, and wherein said first clamp member and the first drill guide member fixed on the first and second guide rods and the second clamp member and the second drill guide member fixed on said at least one secondary guide rod move toward or away from each other depending on a direction of rotation of said rotatable screw.

9. A doweling jig comprising:

first and second clamp members, said first clamp member having a first clamping face, said second clamp member having a second clamping face, said first and second clamping faces facing each other;

first and second guide rods, said clamp members being slidably mounted on said guide rods;

clamping structure engaging on both of said clamp members, said clamping structure being movable to move said clamping faces toward each other into clamping engagement with at least one workpiece; and first and second drill guide members slidably mounted on said first and second guide rods, each drill guide member having at least one drill guide bore therein so that each of two workpieces clamped between said first and second clamp members can be drilled while said two workpieces are clamped together, wherein a distance between each clamp member and each drill guide member can be adjusted.

10. The doweling jig of claim 9, further comprising at least one secondary guide rod disposed through the second clamp member and the second drill guide member, both of which can be fixed to said at least one secondary guide rod, wherein a distance between the second clamp member and the second drill guide member can be adjusted.

11. A doweling jig comprising:

first and second clamp members, at least one dowel slot in said first clamp member, first and second guide rods, said first and second guide rods being mounted on one of said clamp members and the other of said clamp members being movable thereon, said first and second guide rods being parallel and defining a plane, each of said first and second clamp members having a front surface and having an abutting surface, said front surface and said abutting surfaces each lying in a plane parallel to said plane through said guide rods, said planes of said front surface and said abutting surface being at substantially an equal distance from said plane defined by said guide rods, clamp jaws extending beyond said abutting surfaces, so that said first and second clamp members can be selectively placed on said guide rods with their clamp jaws extending to the same or opposite sides of said guide rods, said clamp jaws having clamp faces which are at a right angle to said guide rods so that said clamp jaws can be brought together to clamp a workpiece therebetween;

said second clamp member having a drill guide bore therethrough, said drill guide bore being perpendicular to said plane of said guide rods, said dowel slot being in alignment with said drill guide bore in said second clamp member so that a first workpiece having a dowel extending therefrom can have its dowel engaged in said dowel slot and a second workpiece can have a dowel hole drilled therein through said aligned guide bore so that when the dowel in the first workpiece is engaged in the dowel hole in the second workpiece, the two workpieces are in the same edgewise relationship as when the dowel hole was drilled in the second work piece; and a clamp tightening mechanism interengaging both said first and second clamp members to move said clamp members toward each other for clamping a workpiece between said clamp faces when they are on the same side of said guide rods.

12. The doweling jig of claim 11 wherein both of said clamp members have a drill guide bore therein.

* * * * *

UNITED STATES PATENT AND TRADEMARK OFFICE
CERTIFICATE OF CORRECTION

PATENT NO. : 6,659,695 B2
DATED : December 9, 2003
INVENTOR(S) : Joon Park

It is certified that error appears in the above-identified patent and that said Letters Patent is hereby corrected as shown below:

Column 9,
Line 7, delete "therein means for fixing", insert -- therein, means for fixing --

Signed and Sealed this

Twenty-eighth Day of December, 2004

JON W. DUDAS
*Director of the United States Patent and Trademark Office*